Patented Jan. 2, 1923.

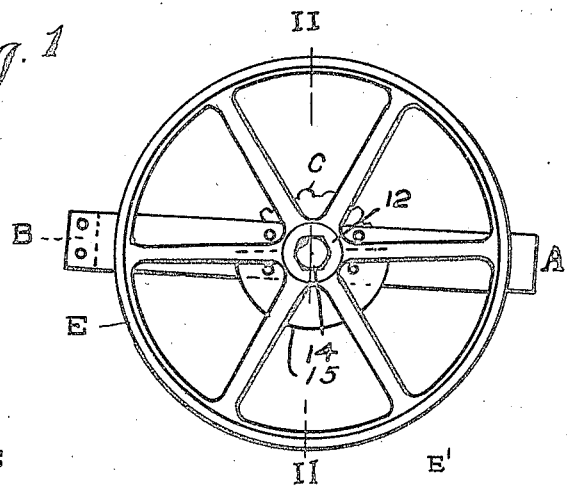
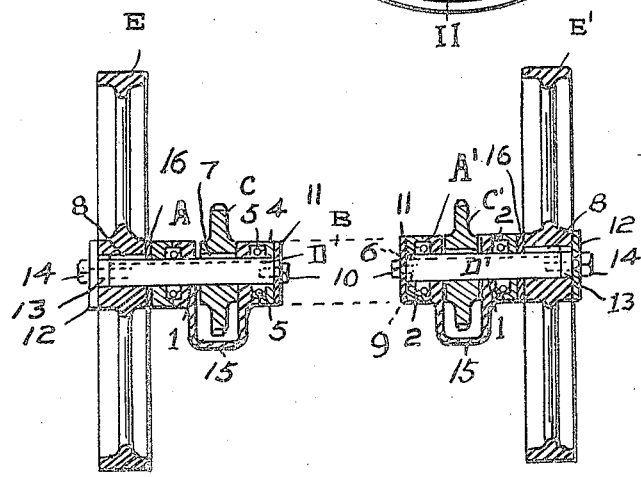
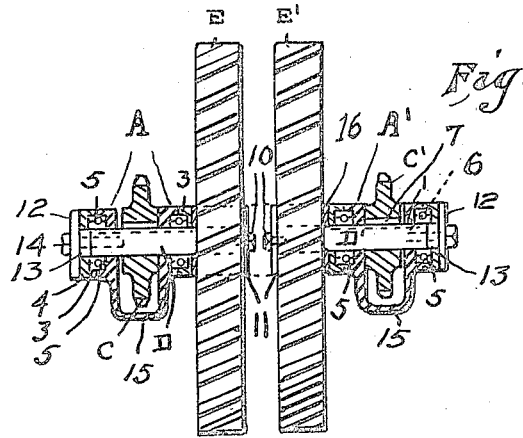

1,441,024

UNITED STATES PATENT OFFICE.

HARRISON QUINBY, OF INDIANAPOLIS, INDIANA, ASSIGNOR TO WILLIAM H. McFARLAND, OF PITTSBURGH, PENNSYLVANIA.

TRACTOR.

Application filed May 3, 1922. Serial No. 558,171.

*To all whom it may concern:*

Be it known that I, HARRISON QUINBY, a citizen of the United States, and residing in the city of Indianapolis, in the county of Marion and State of Indiana, have invented or discovered the new, useful, and Improved Tractors, of which the following is a specification.

My invention consists in certain new and useful improvements in tractors, and it more particularly relates to farm and garden tractors adapted for use in crop cultivation.

In such work it is a great advantage to be able to vary the tread or spacing between the tractor wheels, as the tractor is sometimes used to straddle a row and at other times run along between two rows without straddling.

For the purpose of enabling a change in the tractor tread I provide a tractor having a frame provided with two spaced apart longitudinal or side members, each of the same having mounted thereon a rotary driving member, such as a sprocket or gear which is operatively connected with the tractor engine. Engaging the axial bore of each of the sprockets or other driving member is an axle which is longitudinally slidable in suitable bearings in the corresponding side member of the frame, so as to be shiftable into a position wherein said axle projects inwardly from the side member or outwardly from the same as may be desired. The tractor wheels are mounted on the projecting ends of said axles, and thus when the axles project inwardly, the wheels are close together, and, on the contrary, when the axles project outwardly the wheels are spread apart. If desired one of the axles may project outwardly and the other inwardly, so that one wheel will be outside of the frame and the other inside of the frame, thus giving a third tread breadth.

In the accompanying drawings, wherein is shown a practical embodiment of the principles of my invention, Fig. 1 is a side elevation showing a portion of the tractor frame and the wheels mounted outside of the same; Fig. 2 is a section taken along the line II—II in Fig. 1, and Fig. 3 is a view similar to Fig. 2 but showing the tractor wheels shifted to the inside of the frame.

The following is a detailed description of the drawings.

A and A' represents the two side members of the tractor frame which are connected together, as at front and rear, by cross braces. The rear cross member is indicated at B in dotted lines in Fig. 2.

The side members are bifurcated horizontally to receive the rotary driving members C and C', respectively. These driving members may be sprockets, as shown, or gears, the same being operatively connected to the tractor engine in the usual manner. The bifurcated side members of the frame are provided with bores 1 alined with the axial bore of the sprockets, to receive the short driving axles D and D', respectively. To reduce the friction I prefer to make the axles fit the bores rather loosely, ball bearings being provided to engage the axles. Thus I may provide annular recesses 2 surrounding the outer ends of the bores 1 which register with similar recesses 3 in plates 4 bolted to the side members, thus completing seats for the ball bearings 5 which engage the axle on either side of the sprockets and thus support the tractor on the said axles.

E and E' represent the two tractor wheels which may be mounted on the outer protruding ends of the axles, as in Figs. 1 and 2, or on the inner protruding ends of the axles, as in Fig. 3, the axles being forced to protrude from their bearings at either end, as required. The axles are preferably provided with key slots 6 extending from end to end, and the sprockets are provided with fixed keys 7 which engage said keyways, insuring the rotation of the axles with the sprockets but permitting the axles to slide relatively to the sprockets. The wheels are similarly provided with fixed keys 8 which insure the rotation of the wheels with the axles but permit the wheels to be mounted or dismounted from the axles without difficulty.

Any convenient means may be used to hold the wheels in place on the axles and to prevent accidental longitudinal movement of the axles. Thus I have shown one end of each axle provided with an axial threaded hole 9 into which a bolt 10 may be screwed to hold the washer 11 on the end of the axle. At the other end of the axles I have shown the washer 12 provided with an annular boss 13 which extends inwardly to contact with the end of the axles, the bolt 14 being extended through said washer into a threaded axial hole in the end of the axle. In such case the axles are made somewhat shorter than if they extended entirely through their bearings and the wheels.

15 represents the lower portion of the sprocket or gear boxes which may be integral with or attached to the frame. The upper portions of such boxes are usually carried by the engine housing which is not shown. 16 are thrust washers.

When the tractor is to be used to straddle a row, or where it is being used for traction purposes, the wheels are placed outside of the frame, as shown in Figs. 1 and 2. When a narrow tread is required, as where the tractor is to run between rows, the wheels are placed inside the frame, as shown in Fig. 3.

A third combination or tread may be effected by placing one wheel inside the frame and the other wheel outside of the same.

If desired one of the wheels may be entirely omitted and the other wheel mounted on its axle inside the frame, thus forming a one wheel tractor which will travel between two closely set rows without injury to the crops.

It is evident from the foregoing that the tread of the tractor may be quickly and easily shifted to suit the particular use in view.

What I desire to claim is—

1. In a tractor, the combination of a frame having a pair of spaced apart side members, horizontally disposed bearings on said side members, a short driving axle mounted in each of said bearings, said axles being longitudinally slidable in said bearings whereby said axles may be individually caused to protrude from said side member either outwardly or inwardly of said side members, power driven members mounted on said axles, and a pair of tractor wheels, one of said wheels being adapted to be removably mounted on the protruding end of each axle whereby by shifting the axles said wheels may be mounted either outside or inside of said frame, for the purpose described.

2. In a tractor, the combination of a frame having a pair of spaced apart side members, a rotary driving member mounted on each of said side members, a short axle engaging each of said rotary members and slidable longitudinally therein whereby said axles may be caused to protrude either outwardly or inwardly of said frame, and a pair of traction wheels adapted to be mounted on the protruding ends of said axles whereby said wheels may be mounted either outside or inside of said frame, for the purpose described.

3. In a tractor, the combination of a frame having a pair of spaced apart side members, said side members being provided with alined seats, a rotary driving member mounted in each of said seats, said side members being provided with horizontally disposed bearings alined with the axes of said rotary driving members, a short axle adapted to be inserted through said bearings and said rotary driving member, said axles being longitudinally shiftable and of sufficient length to protrude from said side members, and a pair of traction wheels adapted to be removably mounted on the protruding ends of said axles, whereby said traction wheels may be mounted either outside or inside of said frame, for the purpose described.

Signed at Pittsburgh, Pa., this 29th day of April, 1922.

HARRISON QUINBY.